United States Patent [19]
Ejiri et al.

[11] Patent Number: 5,792,577
[45] Date of Patent: Aug. 11, 1998

[54] NEGATIVE ELECTRODE MATERIAL FOR USE IN LITHIUM-ION SECONDARY BATTERY AND PROCESS FOR PRODUCING THE SAME

[75] Inventors: Hiroshi Ejiri; Yoshinori Yamazaki; Hideyuki Nakajima; Yoshiyuki Nishimura, all of Kamisu-machi, Japan

[73] Assignee: Petoca, Ltd., Tokyo, Japan

[21] Appl. No.: 755,258

[22] Filed: Nov. 22, 1996

[30] Foreign Application Priority Data

Nov. 24, 1995 [JP] Japan .................. 7-327921

[51] Int. Cl.$^6$ ...................................... H01M 4/62
[52] U.S. Cl. ........................... 429/232; 423/447.2
[58] Field of Search ..................... 423/447.2; 429/232

[56] References Cited

U.S. PATENT DOCUMENTS

| | | | |
|---|---|---|---|
| 4,849,200 | 7/1989 | Uemura et al. | 423/447.2 X |
| 4,882,139 | 11/1989 | Beneke et al. | 423/447.2 X |
| 5,167,945 | 12/1992 | Ogawa et al. | 423/447.2 |
| 5,169,616 | 12/1992 | Ross | 423/447.2 X |

FOREIGN PATENT DOCUMENTS

| | | |
|---|---|---|
| 0 644 603 | 3/1995 | European Pat. Off. |
| 0 675 555 | 10/1995 | European Pat. Off. |

OTHER PUBLICATIONS

Patent Abstracts of Japan, JP–A–3 129664, Jun. 3, 1991.
Patent Abstracts of Japan, JP–A–5 283061, Oct. 29, 1993.
Patent Abstracts of Japan, JP–A–6 111818, Apr. 22, 1994.
Patent Abstracts of Japan, JP–A–6 150931, May 31, 1994.
Patent Abstracts of Japan, JP–A–7 085862, Mar. 31, 1995.
Patent Abstracts of Japan, JP–A–7 161347, Jun. 23, 1995.
Patent Abstracts of Japan, JP–A–7 192724, Jul. 28, 1995.
Patent Abstracts of Japan, JP–A–8 069798, Mar. 12, 1996.
Patent Abstracts of Japan, vol. 095, No. 009, Oct. 31, 1995, JP 07 142068, Jun. 2, 1995.
Patent Abstracts of Japan, vol. 015, No. 311, Aug. 8, 1991, JP 03 114106, May 15, 1991.

*Primary Examiner*—Stephen Kalafut
*Attorney, Agent, or Firm*—Oblon, Spivak, McClelland, Maier & Neustadt, P.C.

[57] ABSTRACT

A negative electrode material for use in lithium-ion secondary batteries, comprising milled pitch-based graphite fibers (A) obtained by graphitization at 2400° C. or higher and milled pitch-based carbon fibers (B) obtained by carbonization at 550° to 1300° C. In this negative electrode material, it is preferred that both the milled pitch-based graphite fibers (A) and the milled pitch-based carbon fibers (B) have an average particle size of 10 to 30 μm, that the ratio of milled pitch-based carbon and graphite fibers having a particle size of 5 μm or less to all the milled pitch-based carbon and graphite fibers is not greater than 10% by weight and that the milled pitch-based graphite fibers (A) and the milled pitch-based carbon fibers (B) are blended at a weight ratio (A/B) of 95/5 to 40/60. A negative electrode which has a large capacity at the time of having been stabilized, exhibits a high charge and discharge efficiency at the initial stage and is excellent in charge and discharge cycle characteristics can be provided by the blending of milled pitch-based carbon fibers with milled pitch-based graphite fibers.

6 Claims, No Drawings

NEGATIVE ELECTRODE MATERIAL FOR USE IN LITHIUM-ION SECONDARY BATTERY AND PROCESS FOR PRODUCING THE SAME

FIELD OF THE INVENTION

The present invention relates to a negative electrode material for use in lithium-ion secondary batteries which can advantageously be employed in the production of lithium-ion secondary batteries, and a process for producing the negative electrode material. More particularly, the present invention is concerned with a negative electrode material for use in lithium-ion secondary batteries which can suppress the decomposition of the electrolyte and can provide a lithium-ion secondary battery ensuring high initial charge efficiency, having large charge and discharge capacities at the time of having been stabilized, enabling charging and discharging at high current densities and being excellent in charge and discharge cycle characteristics and further concerned with a process for producing the negative electrode material.

BACKGROUND OF THE INVENTION

The secondary battery in which an alkali metal such as lithium is used as an active material of a negative electrode has generally various advantages. For example, it not only ensures high energy density and high electromotive force, but also has wide operating temperature range due to the use of a nonaqueous electrolyte. Further, the secondary battery is excellent in shelf life, miniaturized and lightweight.

Therefore, the practical use of the above nonaqueous-electrolyte-loaded lithium-ion secondary battery is anticipated as a power source for use in a portable electronic appliance and also as a high-performance battery for use in an electric vehicle and electricity storage.

However, all the developed prototype batteries have not fully realized the above properties anticipated from the lithium-ion secondary battery and thus have been incomplete from the viewpoint of cycle life and charge and discharge characteristics such as charge and discharge capacities, charge and discharge efficiency and charge and discharge current densities.

A major cause thereof resided in a negative electrode used in the secondary battery.

For example, a lithium-ion secondary battery having a negative electrode composed of metal lithium incorporated therein had disadvantageously short cycle life and poor safety because lithium crystallized on the surface of the negative electrode during charging to form acicular dendrite, thereby causing short-circuit to be likely to occur between the negative and positive electrodes.

Lithium has extremely high reactivity, thereby causing the electrolyte to suffer from decomposition reaction in the vicinity of the surface of the negative electrode. Thus, there was the danger that the above decomposition reaction would modify the surface of the negative electrode to thereby cause decrease of the cell capacity due to repeated uses of the secondary battery.

Various studies have been made with a view toward obviating the above problems of the lithium-ion secondary battery. For example, the use of alloys containing lithium, such as lithium/aluminum and Wood's alloy, as the material of the negative electrode of the lithium-ion secondary battery has been studied.

However, this negative electrode composed of such a lithium alloy had a problem of crystal structure change attributed to difference in operating temperature and charge and discharge conditions.

In recent years, extensive researches and developments have been carried out of negative electrode materials for use in lithium-ion secondary batteries which are composed of carbon or graphite materials free from lithium metal crystallization, and also extensive analyses have been made of lithium ion charge and discharge mechanism on these negative electrode materials.

The carbon material can have various structures, for example, what is known as amorphous carbon structure, graphite structure having a superstructure or diamond structure, depending on, for example, the type or method of treatment of the precursor thereof. Carbon and graphite materials having a structure ranging from amorphous carbon to complete graphite crystal are being studied as the negative electrode material for use in lithium-ion secondary batteries. The above carbon and graphite materials include those of intermediate structural configuration, and the lithium ion charge and discharge mechanism thereof is very complicated and cannot be stated as having been fully elucidated.

With respect to the structure ranging from the amorphous carbon to graphite crystal, the carbon material is a material which has a polycrystal structure and low graphitization degree, and in which the growth of graphite crystal is immature and inter-graphite-layer spacing is relatively large. As this carbon material, for example, carbon fibers from coal, coke, polyacrylonitrile (PAN) and isotropic pitch are extensively being studied.

When the above carbon material is used in the negative electrode, lithium ions are present in the form of cluster (state of being aggregated) in a large inter-layer space during charging, which is believed to enable preventing crystallization of lithium metal on the surface of the negative electrode during charging.

The graphite material is a material which has a high graphitization degree and in which the inter-graphite-layer spacing is relatively small as compared with those of the carbon material. The graphite material includes a material having a complete graphite crystal structure. Known examples of these graphite materials include artificial or synthetic graphites obtained, for example, by subjecting the above carbon material to heat treatment (graphitization) at high temperatures as well as natural graphite.

The lithium ion charge and discharge effected in the use of the above graphite material as the negative electrode is explained in terms of the entry in and exit from between planes of a carbon-atom hexagonal net plane laminate, known as lithium ion intercalation in or deintercalation from between graphite layers (inter-layer spacing: about 0.3354 nm). In the use of this graphite material as well, crystallization of metal lithium on the surface of the negative electrode is prevented.

Other properties of the negative electrode required for imparting excellent charge and discharge characteristics and cycle characteristics (life) to the lithium-ion secondary battery are:

(1) ensuring that the amount of lithium ions inactivated inside or on the surface of the negative electrode is small (the lithium-ion irreversible capacity is small);

(2) not causing decomposition of the electrolyte during charging and discharging; and (3) being free from the structure destruction of the negative electrode material per se caused by the repetition of charging and discharging.

However, any of the negative electrodes composed of the conventional carbon and graphite materials can hardly be stated as simultaneously satisfying all of these requirements for properties.

That is, although being advantageous in that the charge and discharge capacities are large and there is no structure destruction by the repetition of charging and discharging, the carbon material generally has drawbacks in that the Li irreversible capacity is so large that not only are the initial charge and discharge efficiency and cycle characteristics low but also the electrolyte is decomposed when the current density is set high during charging and discharging.

The graphite material, although being inferior to the carbon material, has large theoretical charge and discharge capacities. For example, when a graphite material completely composed of graphite crystal is used as the negative electrode, the theoretical capacity (charge or discharge capacity exhibited in the state of $C_6Li$ in which Li is intercalated and stabilized at ordinary temperature under ordinary pressure) of the lithium-ion secondary battery is 372 mAh/g. Further, because the Li irreversible capacity is small, the graphite material has high initial charge efficiency and relatively good cycle characteristics.

However, all the graphite materials having been developed to fail to have charge and discharge capacities as large as the above theoretical capacity and further have a drawback in that the possibility of decomposing the electrolyte cannot be disregarded. Furthermore, it has been reported that the graphite material repeats inter-graphite-layer expansion and shrinkage (inter-layer spacing is increased to about 0.37 nm by intercalation) in accordance with the repetition of Li ion charge and discharge with the result that the graphite layer structure may be destroyed. The decomposition of the electrolyte and the destruction of the graphite layer structure invite deterioration of cycle characteristics.

In particular, the natural graphite encounters the problem that the density of current which can be withdrawn without difficulty is low and charging and discharging conducted at high current densities would lower the charge and discharge efficiency.

As apparent from the above, the carbon material has such general properties that it is excellent in the Li charge and discharge capacities but it is likely to suffer from decomposition of the electrolyte when charge and discharge are conducted at high current densities and has such large Li irreversible capacity that the initial charge and discharge efficiency is low and the cycle characteristics are deteriorated although the extent may vary depending on the type thereof. On the other hand, the graphite material has large discharge capacity although being inferior to the carbon material and has such small Li irreversible capacity that the initial charge efficiency is high and relatively good cycle characteristics are exhibited but it has such tendencies that not only are charging and discharging difficult at high current densities but also the graphite layer structure is destroyed by the repetition of charging and discharging and the cycle characteristics are deteriorated by the decomposition of the electrolyte.

Various attempts have been made toward the discovery and development of carbon material and graphite material which are highly suitable for use in lithium-ion secondary batteries.

For example, Japanese Patent Laid-Open Publication Nos. 7(1995)-85862 and 8(1996)-69798, and Japanese Patent Application Nos. 7(1995)-232071 and 7(1995)-232072 disclose negative electrode materials for use in lithium-ion secondary batteries which contain milled graphite fibers obtained by spinning mesophase pitch, lightly carbonizing the spun pitch fibers according to necessity, milling the optionally carbonized fibers and subjecting the same to further carbonization or graphitization. These negative electrode materials have such properties that charging and discharging can be effected at high current densities, the charge and discharge capacities are large and decomposition of the electrolyte during charging and discharging can be reduced. However, there is demand for the development of a negative electrode material having charge and discharge capacities larger than in the use of these milled graphite fibers alone.

Moreover, with respect to the negative electrode material composed of the conventional graphite material, the voltage profile is flat until just before the completion of the discharge, so that it is difficult to detect the remaining capacity. Therefore, the development of a negative electrode material which not only improves the charge and discharge capacities but also resolves this problem has been desired in the art.

Accordingly, researches and studies have been made on the use of a mixture of carbon materials, a mixture of graphite materials and a mixture of carbon material and graphite material in order to mutually supplement the individual drawbacks of various carbon and graphite materials.

For example, Japanese Patent Laid-Open Publication No. 6(1994)-111818 discloses that an electrode sheet (negative electrode) obtained by blending spherical graphite particles with graphitized short carbon fibers (obtained by graphitizing carbon fibers produced by the vapor phase growth process) in an appropriate proportion has an improved conductivity, exhibits a high capacity, has an increased electrode strength, can prevent falling of the carbon material, for example, from the current collector substrate and enables prolonging the cycle life. However, the discharge capacity decreased depending on conditions, so that the effect of the blending is unsatisfactory.

Japanese Patent Laid-Open Publication No. 5(1993)-283061 discloses a lithium-ion secondary battery in which carbon particles are combined with carbon fibers so as to improve the conductivity and the combination realizes such a bulky structure that the diffusion of the electrolyte is improved through the pores thereby exhibit excellent charge and discharge velocities, output density and cycle characteristics. However, the discharge capacity thereof is as low as 270 mAh/g and still unsatisfactory.

Japanese Patent Laid-Open Publication No. 3(1991)-129664 discloses the electrode packing density is increased, the voltage flatness during discharging and the charge and discharge cycle characteristics are improved and the energy density is increased by the use in the negative electrode of a composite material comprising fine fibrous graphite and, carried between fibers thereof, a carbonaceous material of an organic polymeric material. However, the initial charge and discharge efficiency is as low as 67% and the amount of lithium inactivated in the initial stage is large, so that the composite material has been impractical.

Japanese Patent Laid-Open Publication No. 6(1994)-150931 discloses an attempt to improve the conductivity which is a drawback of the carbon material, the charge and discharge velocities which are a drawback of the graphite material and the cycle characteristics by blending the carbon material of pitch-based carbon fibers with amorphous particulate graphite material. However, the discharge capacity is still as low as about 200 mAh/g.

Japanese Patent Laid-Open Publication No. 7(1995)-161347 discloses that the blending in equal amounts of highly crystalline PAN-based carbon fibers of low resistivity which have been carbonized at high temperature with lowly crystalline PAN-based carbon fibers of high resitivity which have been carbonized at low temperature enables mutually supplementing the respective drawbacks of the two types of carbon fibers and providing a negative electrode material which possesses a large discharge capacity and exhibits a low initial capacity loss. However, the initial discharge capacity is still as small as about 240 mAh/g and the initial charge and discharge efficiency is still as low about 55%, so that the negative electrode material has been unable to serve practical use.

Japanese Patent Laid-Open Publication No. 7(1995)-192724 discloses that a combination (mixture) of natural or synthetic graphite powder and powder of carbon material such as hardly graphitizable carbon material (hard carbon material) and/or easily graphitizable carbon material (soft carbon material) enables simultaneously realizing the high true density of the graphite and the lithium-ion diffusion at high velocity of the carbon material without detriment to the high charge and discharge performance and the stability of the positive electrode. However, the graphite powder mentioned as the negative electrode material is natural graphite or artificial graphite obtained by carbonizing an organic material and subjecting the carbonized material to heat treatment at high temperature, and the galvanic performance of the negative electrode material in the combination of the graphite powder and the carbon material powder is exhibited in a special mode of interrupted charging and discharging and is not customary.

As apparent from the above, the known negative electrode materials composed of mixtures of carbon and graphite materials still have drawbacks in that the initial charge and discharge efficiency is low, the charge and discharge velocities are low because the charge and discharge current densities cannot be set high, the cycle life is short, satisfactorily large charge and discharge capacities cannot be realized.

The inventors have conducted extensive and intensive studies on the configuration, combination and blending proportion of blended carbon and graphite materials along with the selection of starting material and method of production therefor with a view toward solving the above problems of the prior art. As a result, it has been found that the above problems of the known negative electrode materials can be solved by blending milled pitch-based carbon fibers and milled pitch-based graphite fibers which are produced from pitch as a starting material and which are different from each other in the graphitization degree (regulated by heating temperature). The present invention has been completed on the basis of this finding.

OBJECT OF THE INVENTION

It is an object of the present invention to provide a negative electrode material for use in lithium-ion secondary batteries which can suppress the decomposition of the electrolyte and can provide a lithium-ion secondary battery ensuring high initial charge efficiency, having large charge and discharge capacities at the time of having been stabilized, enabling charging and discharging at high current densities and being excellent in charge and discharge cycle characteristics, and further to provide a process for producing the negative electrode material.

It is another object of the present invention to provide a negative electrode material for use in lithium-ion secondary batteries which realizes gradual drop of the voltage just before the completion of the discharge, the amount of said drop (or differential value taken versus time) enabling easily detecting the remaining capacity, and further to provide a process for producing the negative electrode material.

From another viewpoint, it is a further object of the present invention to provide a process for producing a negative electrode material for use in lithium-ion secondary batteries which enables easily producing a carbon material for negative electrodes having a graphite layer structure especially advantageous for the entry and exit of lithium ions, having a substantially identical particle size distribution, ensuring easy uniform blending and enabling easy two-dimensional orientation, therefore, which enables easily forming a negative electrode material of high packing density.

SUMMARY OF THE INVENTION

The negative electrode material for use in lithium-ion secondary batteries according to the present invention comprises:

milled pitch-based graphite fibers (A) obtained by graphitization at 2400° C. or higher and milled pitch-based carbon fibers (B) obtained by carbonization at 550° to 1300° C.

In the negative electrode material for use in lithium-ion secondary batteries according to the present invention, it is preferred that both the milled pitch-based graphite fibers (A) and the milled pitch-based carbon fibers (B) have an average particle size of 10 to 30 μm and that the ratio of milled pitch-based carbon and graphite fibers having a particle size of 5 μm or less to all the milled pitch-based carbon and graphite fibers be not greater than 10% by weight.

Further, it is preferred that the milled pitch-based graphite fibers (A) and the milled pitch-based carbon fibers (B) be blended at a weight ratio (A/B) of 95/5 to 40/60.

Still further, it is preferred that the milled pitch-based graphite fibers (A) be obtained by carbonizing infusibilized pitch fiber at 500° to 1500° C., milling the carbonized fiber to obtain milled fibers and graphitizing the milled fibers at a temperature of 2400° C. or higher.

The process for producing a negative electrode material for use in lithium-ion secondary batteries according to the present invention comprises the steps infusibilizing pitch fiber to thereby obtain infusibilized pitch fiber;

carbonizing the infusibilized pitch fiber at 550° to 1300° C. and milling the carbonized fiber to thereby obtain milled pitch-based carbon fibers (B);

carbonizing the infusibilized pitch fiber at 500° to 1500° C., milling the carbonized fiber to obtain milled fibers and graphitizing the milled fibers at a temperature of 2400° C. or higher to thereby obtain milled pitch-based graphite fibers (A);

blending the milled pitch-based graphite fibers (A) with the milled pitch-based carbon fibers (B) to thereby obtain a blended carbon material; and molding the obtained blended carbon material into negative electrode material.

In the process for producing a negative electrode material for use in lithium-ion secondary batteries according to the present invention, it is preferred that the pitch fiber be produced by spinning mesophase pitch.

Further, in the process of the present invention, it is preferred that the milled pitch-based graphite fibers (A) be produced by graphitizing part of the milled pitch-based carbon fibers (B) and blended with the balance of the milled pitch-based carbon fibers (B).

The lithium-ion secondary battery using the negative electrode material of the present invention may comprise:

a positive electrode;

a negative electrode obtained by molding the above negative electrode material; and a nonaqueous electrolyte containing a lithium salt as an electrolytic substance.

DETAILED DESCRIPTION OF THE INVENTION

The negative electrode material for use in lithium-ion secondary batteries and process for producing the negative electrode material according to the present invention, and the lithium-ion secondary battery including the negative electrode material will be described in detail below.

The negative electrode material for use in lithium-ion secondary batteries according to the present invention comprises milled pitch-based graphite fibers (A) obtained by graphitization at specified temperature or higher and milled pitch-based carbon fibers (B) obtained by carbonization at temperature within a specified range which is lower than the graphitization temperature.

Herein, the fibers obtained by milling are referred to as "milled fibers", the fibers obtained by milling carbon fibers are referred to as "milled carbon fibers" and the fibers obtained by milling graphite fibers are referred to as "milled graphite fibers".

There is no difference between the milled pitch-based graphite fibers (A) and milled pitch-based carbon fibers (B) to be employed in the present invention in that pitch is used as the starting material. These milled pitch-based graphite fibers (A) and milled pitch-based carbon fibers (B) will be described in detail along with the process for producing the same.

The milled pitch-based graphite fibers (A) and milled pitch-based carbon fibers (B) to be employed in the present invention are appropriately produced, for example, by executing the spinning step in which pitch as the starting material is spun to thereby obtain pitch fiber and subsequently the infusibilization step in which the pitch fiber is infusibilized and thereafter carrying out, in optional sequence, the milling step in which the fiber holding the length at the spinning is milled and the carbonization and/or graphitization step in which the infusibilized pitch fibers are carbonized and/or graphitized, respectively.

The spinning step and infusibilization step which are common to the productions of milled pitch-based graphite fibers (A) and milled pitch-based carbon fibers (B) will first be described below.

The pitch used as the starting material of the milled pitch-based graphite fibers (A) and milled pitch-based carbon fibers (B) in the present invention is not particularly limited as long as it is spinnable. For example, it may be any of petroleum pitch, coal pitch and synthetic pitch and also may be any of isotropic pitch and mesophase pitch. Easily graphitizable mesophase pitch, especially, one whose mesophase content is 100% is preferred among the pitches.

Although the softening point of the starting pitch is not particularly limited, in connection with the spinning temperature, it is advantageous to employ a starting pitch having low softening point and high infusibilization reaction rate from the viewpoint of the production cost and stability.

Thus, the softening point of the starting pitch desirably ranges from 230° to 350° C., especially, from 250° to 310° C.

The method of spinning the starting pitch is not particularly limited. For example, use can be made of various techniques such as melt spinning, melt blow, centrifugal spinning techniques. Especially, the melt blow technique is preferred from the viewpoint of spinning productivity and quality of obtained fibers.

In the melt blow technique, each spinning orifice has a diameter generally ranging from 0.1 to 0.5 mm, preferably, from 0.15 to 0.3 mm.

Further, the spinning speed is generally at least 500 m/min, preferably, at least 1500 m/min and, still preferably, at least 2000 m/min.

Although slightly varied depending on the employed starting pitch, the spinning temperature may be one which is not lower than the softening temperature of the starting pitch and at which the pitch is not deteriorated. The spinning temperature generally ranges from 300° to 400° C. and, preferably, from 300° to 380° C.

When the mesophase pitch is used as the starting pitch, the pitch fiber obtained by spinning at viscosity as low as tens of poises or below followed by high-rate cooling has the orientation of aromatic ring pitch molecules effected to the interior of the fiber. The carbon fiber or graphite fiber obtained from this pitch fiber has such a structure that graphite layers extend substantially radially about the fiber axis and that the graphite layer surface is exposed at the periphery of the fiber. Accordingly, this carbon fiber or graphite fiber has such advantages that a structure in which the intergraphite-layer space opens outward at the periphery of the fiber is realized to thereby facilitate the entry and exit of lithium ions with the result that the charge and discharge velocities can be increased at increased current density and that the capacity is scarcely lowered irrespective of the repetition of charging and discharging.

The obtained pitch fiber can be infusibilized by various methods, for example, the method in which the fiber is heated in an oxidative gas atmosphere of nitrogen dioxide, oxygen or the like, the method in which the fiber is treated in an oxidative aqueous solution of nitric acid, chromic acid or the like and the method in which the fiber is subjected to polymerization treatment using light or gamma rays.

A simple method for infusibilizing the fiber is one in which the fiber is heated at 200° to 350° C. in the air for a given period of time. In this method, the average temperature elevation rate is generally at least 3° C./min, preferably, at least 5° C./min.

The milled pitch-based graphite fibers (A) and milled pitch-based carbon fibers (B) for use in the present invention can be produced by subjecting the thus obtained infusibilized fiber to the following milling and carbonization steps, and if necessary, the graphitization step.

The process for producing the milled pitch-based carbon fibers (B) from the infusibilized pitch fiber will first be described below.

Milling step

In the usual carbon fiber, the penetration of lithium ions through the fiber surface is difficult and the entry and exit of lithium ions is carried out only through the section of the fiber. Thus, the lowering of the capacity thereof tends to be conspicuous at high charge and discharge velocities. Therefore, it is preferred to mill the fiber to thereby decrease the fiber length, that is, to maximize the sectional surface area of the fiber so as to facilitate the entry and exit of lithium ions through the section of the fiber.

The milled pitch-based carbon fibers (B) for use in the present invention may be produced either by milling the above infusibilized pitch fiber and carbonizing the resultant milled infusibilized fibers in the below described manner or by carbonizing the infusibilized pitch fiber and milling the resultant pitch-based carbon fiber.

However, care must be taken because milling of the carbon fiber to such an extent that pulverization results would invite exposure of active internal texture of the fiber to thereby cause reaction with the electrolyte, so that capacity lowering and other disadvantages would be encountered. That is, effecting milling for increasing the fiber sections while maintaining the fiber configuration is important from the viewpoint of improving the battery performance.

The milling of the infusibilized pitch fiber or pitch-based carbon fiber is effectively carried out, for example, by the method in which a rotor equipped with a plate is revolved at a high speed to thereby cut the fiber in the direction perpendicular to the fiber axis. In particular, the milling of the above fiber may be conducted by the use of, for example, the victory mill, jet mill or cross flow mill.

In the above milling, the length of milled fibers can be controlled by regulating the rotating speed of the rotor, the angle of the plate, the size of porosity of a filter attached to the periphery of the rotor.

The use of the Henschel mixer, ball mill or crusher can be considered for milling the fiber.

However, this milling cannot be stated to be an appropriate means because not only does pressure apply to the fiber in the direction at right angles to the fiber to thereby increase the probability of longitudinal cracks along the fiber axis but also the milling takes a prolonged period of time.

Carbonizing step

The infusibilized pitch fiber optionally having been milled is heated (carbonized) in an inert gas atmosphere or in the absence of oxidative gas according to the customary procedure so that it can be converted to a pitch-based carbon fiber.

In the present invention, although the temperature elevation rate and holding time at the carbonization are not particularly limited, the carbonization is generally conducted at 550° to 1300° C., preferably, 650° to 1200° C.

When the carbonization temperature is lower than 550° C., the carbon fiber per se still contains hydrogen, oxygen and other noncarbon elements in high proportion, so that it is not only electrochemically unstable but also has poor conductivity with the result that the cycle characteristics of the negative electrode material produced therefrom are deteriorated.

On the other hand, the carbon fiber obtained by heating at high temperature exceeding 1300° C. is a carbon material which is excellent in chemical stability and conductivity because substantially all of the fiber is now composed only of carbon element. However, unfavorably, the amount of lithium admitted therein is so small that the effect of the blending of the milled carbon fibers with the below described milled pitch-based graphite fibers (A) is deteriorated.

When the milling is conducted prior to the carbonization, the above carbonization gives the milled pitch-based carbon fibers (B). On the other hand, when the infusibilized fiber before milling is carbonized, the milled pitch-based carbon fibers (B) can be obtained by milling in the above manner the pitch-based carbon fiber produced by the carbonization.

With respect to the graphitization degree in terms X-ray diffractometry data, the thus obtained milled pitch-based carbon fibers (B) have an inter-layer spacing of graphite layers ($d_{002}$) of at least 0.350 nm and a crystallite size along c-axis (Lc) of not greater than 5 nm.

The X-ray diffractometry employed herein is a method in which a diffraction pattern of the carbon fiber is obtained with the use of Cukα and a highly purified silicon as the X-ray source and reference material, respectively. The inter-layer spacing ($d_{002}$) and size of crystallite along the c-axis ($Lc_{(002)}$) have respectively been calculated from the peak position and half-value width of the 002 diffraction pattern, and the size of crystallite along the a-axis ($La_{(110)}$) has been calculated from the peak position and half-value width of the 110 diffraction pattern, in accordance with the method of the Japan Society for Promotion of Scientific Research. The ratio of diffraction peak 101 to diffraction peak 100 is determined through a procedure comprising drawing a base line on the obtained diffraction pattern diagram, measuring the heights of diffraction peak 101 (2θ approximately equal to 44.5) and diffraction peak 100 (2θ approximately equal to 42.5) from the base line and calculating the quotient of the height of diffraction peak 101 divided by the height of diffraction peak 100.

Now, the process for producing the milled pitch-based graphite fibers (A) from the infusibilized pitch fiber will be described below.

Milling step

The packing degree per volume is preferred to be high for effectively executing the below described graphitization, and it is advantageous to graphitize the milled material from the viewpoint that the heat treatment cost is reduced.

Thus, although the milled pitch-based graphite fibers (A) would be produced by first conducting graphitization and then milling, it is advantageous to conduct the above milling after the infusibilization or after the above carbonization of the infusibilized fiber at 250° to 1500° C., preferably, 550° to 1300° C. and, still preferably, 650° to 1200° C. and thereafter graphitization.

The process in which the milled infusibilized pitch fiber, or especially, pitch-based carbon fiber is graphitized enables reduction of the graphitization energy cost, enables preventing longitudinal cracking of fiber at the milling and is effective in inhibiting the decomposition of the electrolyte because, during the graphitization conducted at higher temperature, polycondensation and cyclization reaction are advanced at the graphite layer plane newly exposed on the fiber surface by the milling to thereby lower the activity of the surface.

The process in which the infusibilized pitch fiber or pitch-based carbon fiber is first graphitized and then milled is not desirable because cracks are likely to occur along the graphite layer plane having grown along the fiber axis with the result that the proportion of broken surface area to the total surface area of the produced milled graphite fibers is likely to increase to thereby invite the localization of electrons on the broken graphite layer plane and thus the decomposition of the electrolyte.

Especially, conducting the carbonization at 550° to 1300° C. as in the carbonization for obtaining the milled pitch-based carbon fibers (B) enables simplification of the process control. Moreover, the process in which the milled pitch-based graphite fibers (A) is produced by graphitizing part of the milled pitch-based carbon fibers (B) obtained in the above manner and blended with the balance of the milled pitch-based carbon fibers (B) is advantageous because the milled pitch-based graphite fibers (A) and milled pitch-based carbon fibers (B) having substantially the same particle size distributions can readily be produced.

Although graphitization of the milled pitch-based carbon fibers (B) is likely to form milled pitch-based graphite fibers (A) having a decreased fiber diameter and a decreased specific surface area, no significant difference is recognized with respect to the particle size distribution and the milled pitch-based carbon fibers (B) and the milled pitch-based graphite fibers (A) can have substantially the same particle size distribution ranges.

Graphitization step

Although the pitch fiber is commonly graphitized at 2000° C. or higher, it is required that the pitch-based carbon fiber as used in the present invention undergo increased graphitization (raised heating temperature) for expanding the battery capacity.

Thus, the milled pitch-based graphite fibers (A) for use in the present invention are produced by graphitizing the milled infusibilized pitch fibers or pitch-based carbon fibers at 2400° C. or higher, preferably, 2500° C. or higher.

The increase of the degree of graphitization of the milled pitch-based graphite fibers (A) is desired because the charge and discharge capacities are increased and the effect of the blending with the milled pitch-based carbon fibers (B) is manifestly exerted possibly due to the more conspicuous difference in properties therebetween.

Therefore, at the heating for graphitization, higher temperatures are desired from the viewpoint of the properties of obtained negative electrode material. However, the production cost is sharply increased with the increase of the temperature. Moreover, at temperatures exceeding 3000° C., commercially stable production is difficult from the durability of the furnace material used in the graphitization. Accordingly, selection of suitable temperature is required taking the purpose into account.

Further, in order to attain a high graphitization degree, the graphitization of milled infusibilized pitch fibers or pitch-based carbon fibers may be executed in the presence of, for example, a boric compound, apart from the increase of the heating temperature.

With respect to the graphitization degree in terms X-ray diffractometry data, the thus obtained milled pitch-based graphite fibers (A) have an inter-layer spacing of graphite layers ($d_{002}$) of not greater than 0.338 nm, a crystallite size along c-axis (Lc) of at least 35 nm, a crystallite size along a-axis (La) of at least 50 nm and a peak ratio of diffraction peak 101 to diffraction peak 100 ($P_{101}/P_{100}$) of at least 1.0.

The negative electrode material for use in lithium-ion secondary batteries according to the present invention comprises the thus produced milled pitch-based graphite fibers (A) and milled pitch-based carbon fibers (B).

From the viewpoint that a negative electrode material of high packing density is obtained, it is preferred that, with respect to the particle size distribution by laser diffractometry, the above milled pitch-based graphite fibers (A) and milled pitch-based carbon fibers (B) have 10%, 50% and 90% cumulative diameters respectively ranging from 8 to 15 µm, 10 to 20 µm and 30 to 60 µm and have an average particle size of 10 to 30 µm, especially, 15 to 25 µm.

Further, with respect to the milled pitch-based graphite fibers (A) and milled pitch-based carbon fibers (B) for use in the present invention, it is preferred that the ratio of milled fibers having a particle size of not greater than 5 µm to all the milled fibers be not greater than 10% by weight, especially, not greater than 5% by weight and that the ratio of milled fibers having a fiber length of at least 125 µm to all the milled fibers be not greater than 1% by weight, especially, 0% by weight.

When the ratio of milled fibers having a particle size of not greater than 5 µm to all the milled fibers is greater than 10% by weight, the proportion of fine particles having active surface is increased to thereby invite a rapid decomposition of the electrolyte, so that the initial charge and discharge efficiency and the cycle characteristics are deteriorated. When the ratio of milled fibers having a fiber length of at least 125 µm to all the milled fibers is greater than 1% by weight, an unfavorable thickness irregularity is caused at the time of sheeting.

The regulation of the above average particle size and particle size distribution can be easily effected at an arbitrary stage of, for example, milling or blending optionally with the use of a classifier, a sieve or the like.

In the blending, it is desired that the milled pitch-based graphite fibers (A) and the milled pitch-based carbon fibers (B) have substantially the same particle size distribution ranges from the viewpoint that the dispersion is uniform, the packing density is increased and the negative electrode of uniform thickness, for example, in the form of an electrode sheet can be produced. In the sheeted negative electrode material of uniform dispersion, localized polarization scarcely occurs and the capabilities of the milled pitch-based graphite fibers (A) and milled pitch-based carbon fibers (B) can be fully exerted.

As described above, the process in which the milled pitch-based graphite fibers (A) is produced by graphitizing part of the milled pitch-based carbon fibers (B) and blended with the balance of the milled pitch-based carbon fibers (B) is advantageous for the production of the milled pitch-based graphite fibers (A) and the milled pitch-based carbon fibers (B) having substantially the same particle size distribution ranges as the negative electrode material. In this process, a process simplification can be attained, so that cost reduction can be expected.

The use of milled pitch-based graphite fibers (A) and milled pitch-based carbon fibers (B) of high purities is preferred from the viewpoint that the obtained negative electrode material can have enhanced charge and discharge efficiency.

Specifically, the pitch-based carbon fiber and graphite fiber generally contain elements other than carbon, such as nitrogen, oxygen, sulfur and various metal components, depending on the type of the employed starting material.

In the lithium-ion secondary battery, lithium reacts with elements other than carbon, such as sulfur, nitrogen and halogens, to thereby form lithium compounds, so that the use of the negative electrode material containing such impurities in high proportion leads to grave lowering of the charge and discharge efficiency, especially, the initial charge and discharge efficiency of the negative electrode.

It is important that the total content of such impurities be limited to not greater than 1000 ppm, preferably, not greater than 300 ppm.

Generally, the purity of the pitch-based carbon fiber and graphite fiber highly depends on the starting material employed. It is advantageous to pitch having a low content of impurities or having impurities removed by filtration, etc. as the starting material.

Most impurities become gases and are discharged outside the system at the time of heating for carbonization or graphitization. For attaining higher purity, it is desirable to introduce a halogen gas, for example, chlorine gas at the time of carbonization or graphitization to thereby react it with the impurities.

There is the tendency that the higher the heating temperature, the lower the impurities content. From this viewpoint as well, it is advantageous to use the milled pitch-based graphite fibers (A) which are highly graphitized.

As apparent from the foregoing, the use of milled pitch-based graphite fibers (A) and milled pitch-based carbon fibers (B) which can be produced from pitch as the starting material through several common steps ensures the following advantages in the process for producing the negative electrode material.

(1) A pitch fiber having the orientation of aromatic ring pitch molecules promoted up to the inteior of the fiber can be obtained by spinning pitch, especially, mesophase pitch. In the carbon fiber or graphite fiber produced therefrom, graphite layers are formed along the molecule orientation to thereby facilitate the lithium ion entry in and exit from the negative electrode material. That is, the milled pitch-based graphite fibers (A) and milled pitch-based carbon fibers (B) have inter-layer voids as the entrance and exit for lithium ions on all the surface thereof including the circumferential face and upper and lower end faces of the fibers and thus have a graphite layer structure especially suitable for the entry and exit of lithium ions which is fundamentally different from those of matters obtained by pulverizing natural graphite or carbonized or graphitized pitch or organic polymers or by carbonizing or graphitizing powdery pitch or organic polymers.

(2) Both the carbon material and the graphite material used in mixture are formed into milled fibers, so that the surface area can be enlarged and that the exposure of active surface having been present in the internal texture of the fibers can be prevented by having the milled fibers hold the cylindrical configuration characteristic of the fibers.

(3) For example, in the production of a sheeted negative electrode material, the formation of both the carbon material and the graphite material into milled fibers facilitates two-dimensional orientation, facilitates sheeting and enables increasing the packing density of sheet.

(4) Both the carbon material and the graphite material can be produced from the same type of starting material through a number of common steps, so that it is easy to regulate the milling so as to obtain substantially the same particle size distributions and to conduct relatively uniform blending with the result that the dispersion of battery performance can be minimized.

The negative electrode material for use in lithium-ion secondary batteries according to the present invention comprises the above described milled pitch-based graphite fibers (A) and milled pitch-based carbon fibers (B) so as to mutually supplement the drawbacks thereof. Thus, the negative electrode material enables providing a lithium-ion secondary battery which exhibits high initial charge and discharge efficiency, is excellent in charge and discharge cycle characteristics and has a larger capacity at the time of having been stabilized than in the use of each individual of the milled pitch-based graphite fibers (A) and the milled pitch-based carbon fibers (B).

This negative electrode material for use in lithium-ion secondary batteries according to the present invention can be produced by blending the milled pitch-based graphite fibers (A) with the milled pitch-based carbon fibers (B) and molding the blend in the customary manner. Both the milled pitch-based graphite fibers (A) and the milled pitch-based carbon fibers (B) may be composed of a single type of milled fibers or a mixture of at least two types of milled fibers. How many types of milled pitch-based graphite fibers (A) or milled pitch-based carbon fibers (B) are to be used in combination may be determined taking into account the required performance of the battery, the simplification of the process, etc.

In the negative electrode material of the present invention, the milled pitch-based graphite fibers (A) and the milled pitch-based carbon fibers (B) are generally blended at a weight ratio (A/B) of 95/5 to 40/60, preferably, 90/10 to 60/40.

When the weight ratio (A/B) is lower than 40/60, the exertion of the effect of the blending of the milled pitch-based graphite fibers (A) is sharply deteriorated in accordance with the decrease of the proportion of blended milled pitch-based graphite fibers (A) with the result that not only the initial efficiency but also the cycle characteristics become poor.

On the other hand, when the weight ratio (A/B) exceeds 95/5, not only is the charge capacity decreased because of the fading of the effect of the blending of the milled pitch-based carbon fibers (B) but also the voltage profile is flat just prior to the completion of the discharge because of the approach to the performance of the negative electrode material composed only of the milled pitch-based graphite fibers (A), thereby causing capacity indication to be difficult.

The milled pitch-based graphite fibers (A) and milled pitch-based carbon fibers (B) having been blended in the above ratio can easily be fabricated into a sheeted negative electrode material, for example, by blending the same with a binder such as polyethylene or polytetrafluoroethylene, optionally adding an organic solvent or a water solvent to thereby obtain a slurry, and effecting rolling and drying. For example, a sheeted negative electrode material provided with a current collector (total thickness: about 50 to 200 µm) can be fabricated by coating one side or both sides of a metal foil (thickness: about 10 to 50 µm) composed of, for example, copper or nickel with a blend (in slurry form) of the milled pitch-based graphite fibers (A), milled pitch-based carbon fibers (B) and binder, followed by rolling and drying.

The thus obtained negative electrode material for use in lithium-ion secondary batteries according to the present invention as it is or after being cut into a desired shape and size can be assembled with the conventional positive electrode and electrolyte containing a lithium salt into a lithium-ion secondary battery which is excellent in charge and discharge characteristics such as charge and discharge capacities and in cycle characteristics (life) and which is most suited for miniaturization.

Although the type of solvent of the electrolyte to be incorporated in the above lithium-ion secondary battery is not particularly limited as long as it can dissolve lithium salts, it is preferred to employ an aprotic organic solvent having high dielectric constant.

Examples of such organic solvents include propylene carbonate, ethylene carbonate, tetrahydrofuran, 2-methyltetrahydrofuran, dioxolane, 4-methyldioxolane, acetonitrile, dimethyl carbonate, methyl ethyl carbonate and diethyl carbonate. These solvents may be used either individually or in appropriate combination.

Lithium salts as the electrolytic substance to be contained in the electrolyte are not limited as long as they are capable of forming stable anions, and suitable examples thereof include lithium perchlorate, lithium borofluoride, lithium hexachloroantimonate, lithium hexafluoroantimonate and lithium hexafluorophosphate (LiPF$_6$).

Various materials can be used for composing the positive electrode of the lithium-ion secondary battery, which include, for example, metal oxides such as chromium oxide, titanium oxide, cobalt oxide and vanadium pentoxide; lithium metal oxides such as lithium manganese oxide (LiMn$_2$O$_4$), lithium cobalt oxide (LiCoO$_2$) and lithium nickel oxide (LiNiO$_2$); transition metal chalcogen compounds such as titanium and molybdenum sulfides; and conductive conjugated polymeric substances such as polyacetylene, polyparaphenylene and polypyrrole.

A separator may be interposed between the above positive and negative electrodes, which separator is comprised of a nonwoven or woven fabric of synthetic or glass fibers, a polyolefinic porous membrane, a nonwoven fabric of polytetrafluoroethylene or the like.

The lithium-ion secondary battery using the negative electrode material of the present invention can be produced by assembling the above specified negative electrode of the present invention and other battery constituting elements such as the positive electrode, the electrolyte, the separator, the current collector, a gasket, a sealing plate and a casing into a cylindrical, rectangular or buttony lithium-ion secondary battery according to the customary procedure.

For example, the lithium-ion secondary battery in cylindrical form can be produced by cutting the above sheeted negative electrode material provided with the current collector so as to have a predetermined length and width and winding the resultant negative electrode material together with the positive electrode and separator into a can.

EFFECT OF THE INVENTION

The negative electrode material for use in lithium-ion secondary batteries according to the present invention comprises the above described milled pitch-based graphite fibers (A) and milled pitch-based carbon fibers (B) so as to mutually supplement the drawbacks thereof. Thus, the negative electrode material enables providing a lithium-ion secondary battery which exhibits high initial charge and discharge efficiency, is excellent in charge and discharge cycle characteristics and has a larger capacity at the time of having been stabilized than in the use of each individual of the milled pitch-based graphite fibers (A) and the milled pitch-based carbon fibers (B).

The process for producing a negative electrode material for use in lithium-ion secondary batteries according to the present invention is especially suitable for production of the above negative electrode material of the present invention. Because the spinning and infusibilization stpes are common thereto, this process enables easily producing milled pitch-based graphite fibers (A) and milled pitch-based carbon fibers (B) which have graphite layer structures especially suited for the lithium ion entry and exit, have substantially the same particle size distributions, are readily blended with each other uniformly and easily undergo two-dimensional orientation, thereby enabling easily forming a negative electrode material of high packing density.

EXAMPLE

The present invention will further be illustrated below with reference to the following Examples, which in no way limit the scope of the invention.

Example 1

A starting material of optically anisotropic petroleum mesophase pitch having a specific gravity of 1.25 was melted and drawn through a nozzle comprising a 3 mm wide slit and, arranged therein, a line of 500 spinning orifices each having a diameter of 0.2 mm while injecting hot air through the slit, thereby obtaining pitch fibers having an average diameter of 13 µm. The spinning temperature was 360° C. and the delivery was 0.8 g/H-min.

The spun pitch fibers were collected on a belt having a collection zone of 20-mesh stainless steel net while sucking from the back of the belt.

The resultant collected fiber mat was heated in the air at a temperature which was elevated from room temperature to 300° C. at an average elevation rate of 6° C./min to thereby infusibilize the fiber mat.

Subsequently, the thus obtained infusibilized fiber mat was carbonized at 750° C. and milled with the use of a cross flow mill to thereby obtain milled pitch-based carbon fibers (B).

The particle size of the obtained milled fibers was measured by the use of powder particle size meter SALD-3000 (measurement made by laser diffractometry) manufactured by Shimadzu Corp., providing that the refractive index of particles was 1.80–0.20 i. As a result, it was found that the average particle size was 19.5 µm and the ratio of milled carbon fibers having a particle size of not greater than 5 µm to all the milled carbon fibers was 1.3% by weight and that 10%, 50% and 90% cumulative diameters were 11.0 µm, 17.5 µm and 45.2 µm, respectively.

Part of the above milled pitch-based carbon fibers (B) were heated while raising the temperature to 2900° C. at a temperature elevation rate of 3° C./min and keeping the temperature at 2900° C. for 1 hr so as to effect graphitization, thereby obtaining milled pitch-based graphite fibers (A).

The particle size of the obtained milled fibers was also measured by the use of the above powder particle size meter. As a result, it was found that the average particle size was 17.3 µm and the ratio of milled graphite fibers having a particle size of not greater than 5 µm to all the milled graphite fibers was 2.9% by weight and that 10%, 50% and 90% cumulative diameters were 8.7 µm, 16.0 µm and 45.8 µm, respectively.

The thus obtained milled pitch-based graphite fibers (A) were uniformly blended with the balance of the milled pitch-based carbon fibers (B) in a weight ratio of 95:5. Polytetrafluoroethylene of 3% by weight was added to the milled fiber blend and kneaded to thereby obtain a pellet as a negative electrode. A charge and discharge test of the negative electrode was performed with the use of a triode cell. The test was conducted with the use of metal 1M of lithium perchlorate (LiClO$_4$) as an electrolytic substance was dissolved in a mixed carbonic ester solvent obtained by mixing ethylene carbonate (EC) and dimethyl carbonate (DMC) in a ratio of 1:1 by volume. Thus, the charge and discharge capacity characteristics were measured.

The measurement of charge and discharge capacity characteristics was made at a constant current of 100 mA/g. The discharge capacity was defined as the capacity until the fall of the cell voltage to 2 V. The measurement was repeated 10 times.

The blending of the milled pitch-based graphite fibers (A) and milled pitch-based carbon fibers (B) improved the 10th charge and discharge capacities as compared with those exhibited in the use of each individual thereof and enabled having gradual voltage change at the final stage of the discharge as compared with that exhibited in the use of the milled pitch-based graphite fibers (A) only to thereby show the suitability for indication of remaining capacity. The measurement results are given in Table 1.

Examples 2 and 3

Electrodes were produced in the same manner as in Example 1, except that the milled pitch-based graphite fibers (A) were blended with the balance of the milled pitch-based carbon fibers (B) in a weight ratio (A/B) of 80:20 and 40:60.

The charge and discharge capacity characteristics of the obtained electrodes were measured in the same manner as in Example 1.

The blending of the milled pitch-based graphite fibers (A) and milled pitch-based carbon fibers (B) improved the 10th charge and discharge capacities as compared with those exhibited in the use of each individual thereof and enabled having gradual voltage change at the final stage of the discharge as compared with that exhibited in the use of the milled pitch-based graphite fibers (A) only to thereby show the suitability for indication of remaining capacity. The measurement results are given in Table 1.

Comparative Examples 1 and 2

Electrodes were produced in the same manner as in Example 1, except that the milled pitch-based graphite fibers (A) and milled pitch-based carbon fibers (B) obtained in Example 1 were individually used without being blended.

The charge and discharge capacity characteristics of the obtained electrodes were measured in the same manner as in Example 1. The measurement results are given in Table 1.

TABLE 1

|  | Ex. 1 | Ex. 2 | Ex. 3 | Co. Ex. 1 | Co. Ex. 2 |
| --- | --- | --- | --- | --- | --- |
| Milled carbon fiber |  |  |  |  |  |
| Carbonization temp. (°C.) | 750 | 750 | 750 | 750 |  |
| Content (wt %) | 5 | 20 | 60 | 100 | 0 |
| Milled graphite fiber |  |  |  |  |  |
| Graphatized temp. (°C.) | 2900 | 2900 | 2900 |  | 2900 |
| Content (wt %) | 95 | 80 | 40 | 0 | 100 |
| Electrode characteristics |  |  |  |  |  |
| 1st discharge capacity (mAh/g) | 320 | 324 | 336 | 354 | 301 |
| 1st charge & discharge efficiency (%) | 83 | 81 | 75 | 68 | 84 |
| 10th discharge capacity (mAh/g) | 318 | 320 | 308 | 95 | 300 |
| 10th charge & discharge efficiency (%) | 100 | 98 | 98 | 98 | 99 |

Examples 4 to 7

Milled pitch-based carbon fibers (B) were produced in the same manner as in Example 1, except that the carbonization temperature was as specified in Table 2.

The particle size of the obtained milled pitch-based carbon fibers (B) was measured in the same manner as in Example 1. The measurement results are given in Table 2.

Electrodes were produced in the same manner as in Example 1, except that the milled pitch-based graphite fibers (A) obtained in Example 1 (graphitization temperature: 2900° C.) were uniformly blended with the above obtained milled pitch-based carbon fibers (B) in a weight ratio (A/B) of 80:20.

The charge and discharge capacity characteristics of the obtained electrodes were measured in the same manner as in Example 1. The measurement results are given in Table 2.

Comparative Examples 3 and 4

Milled pitch-based carbon fibers (B) were produced in the same manner as in Example 1, except that the carbonization was conducted at 500° C. and 1400° C. The particle size of the obtained milled pitch-based carbon fibers (B) was measured in the same manner as in Example 1. The measurement results are given in Table 2.

Electrodes were produced in the same manner as in Example 1, except that the milled pitch-based graphite fibers (A) obtained in Example 1 (graphitization temperature: 2900° C.) were uniformly blended with the above obtained milled pitch-based carbon fibers (B) in a weight ratio (A/B) of 80:20.

The charge and discharge capacity characteristics of the obtained electrodes were measured in the same manner as in Example 1. The measurement results are given in Table 2.

TABLE 2

|  | Ex. 4 | Ex. 5 | Ex. 6 | Ex. 7 | Co. Ex. 3 | Co. Ex. 4 |
| --- | --- | --- | --- | --- | --- | --- |
| Milled carbon fiber |  |  |  |  |  |  |
| Carbonization temp. (°C.) | 550 | 650 | 950 | 1300 | 500 | 1400 |
| Content (wt %) | 20 | 20 | 20 | 20 | 20 | 20 |
| Average particle diameter (μm) | 18.7 | 19.4 | 20.1 | 21.4 | 18.1 | 22.3 |
| Ratio of ≦5 μm fibers (wt %) | 2.5 | 1.4 | 1.1 | 1.0 | 2.9 | 0.9 |

TABLE 2-continued

|  | Ex. 4 | Ex. 5 | Ex. 6 | Ex. 7 | Co. Ex. 3 | Co. Ex. 4 |
|---|---|---|---|---|---|---|
| Milled graphite fiber | | | | | | |
| Graphatized temp. (°C.) | 2900 | 2900 | 2900 | 2900 | 2900 | 2900 |
| Content (wt %) | 80 | 80 | 80 | 80 | 80 | 80 |
| Electrode characteristics | | | | | | |
| 1st discharge capacity (mAh/g) | 307 | 312 | 307 | 305 | 305 | 298 |
| 1st charge & discharge efficiency (%) | 72 | 78 | 82 | 82 | 67 | 84 |
| 10th discharge capacity (mAh/g) | 303 | 308 | 303 | 302 | 248 | 274 |
| 10th charge & discharge efficiency (%) | 97 | 98 | 98 | 98 | 96 | 99 |

Examples 8 and 9

Milled pitch-based graphite fibers (A) were produced in the same manner as in Example 1, except that the graphitization was conducted at 2400° C. and 3100° C.

The particle size of the obtained milled pitch-based graphite fibers (A) was measured in the same manner as in Example 1. The measurement results are given in Table 3.

Electrodes were produced in the same manner as in Example 1, except that the above obtained milled pitch-based graphite fibers (A) were uniformly blended with the milled pitch-based carbon fibers (B) obtained in Example 1 in a weight ratio (A/B) of 80:20.

The charge and discharge capacity characteristics of the obtained electrodes were measured in the same manner as in Example 1. The measurement results are given in Table 3.

Comparative Example 5

Milled pitch-based graphite fibers (A) were produced in the same manner as in Example 1, except that the graphitization was conducted at 2300° C.

The particle size of the obtained milled pitch-based graphite fibers (A) was measured in the same manner as in Example 1. The measurement results are given in Table 3.

An electrode was produced in the same manner as in Example 1, except that the above obtained milled pitch-based graphite fibers (A) were uniformly blended with the milled pitch-based carbon fibers (B) obtained in Example 1 in a weight ratio (A/B) of 80:20.

The charge and discharge capacity characteristics of the obtained electrode were measured in the same manner as in Example 1. The measurement results are given in Table 3.

TABLE 3

|  | Ex. 8 | Ex. 9 | Co. Ex. 5 |
|---|---|---|---|
| Milled carbon fiber | | | |
| Carbonization temp. (°C.) | 750 | 750 | 750 |
| Content (wt %) | 20 | 20 | 20 |
| Milled graphite fiber | | | |
| Graphatized temp. (°C.) | 2400 | 3100 | 2300 |
| Content (wt %) | 80 | 80 | 80 |
| Average particle diameter (μm) | 18.1 | 16.9 | 18.6 |
| Ratio of ≦5 μm fibers (wt %) | 3.3 | 2.7 | 3.5 |
| Electrode characteristics | | | |
| 1st discharge capacity (mAh/g) | 306 | 334 | 276 |
| 1st charge & discharge efficiency (%) | 76 | 84 | 78 |
| 10th discharge capacity (mAh/g) | 300 | 328 | 236 |
| 10th charge & discharge efficiency (%) | 97 | 98 | 96 |

Example 10

An electrode was produced in the same manner as in Example 1, except that the milled pitch-based graphite fibers (A) and the milled pitch-based carbon fibers (B-1) obtained in Example 1, and the milled pitch-based carbon fibers (B-2) obtained in Example 6 by carbonization at 950° C. were uniformly blended together in a weight ratio (A/B-1/B-2) of 60:10:30.

The charge and discharge capacity characteristics of the obtained electrode were measured in the same manner as in Example 1. The measurement results are given in Table 4.

Example 11

An electrode was produced in the same manner as in Example 1, except that the milled pitch-based graphite fibers (A) and the milled pitch-based carbon fibers (B) obtained in Example 1, and acetylene black having an average particle size of 1 μm (C) were uniformly blended together in a weight ratio (A/B/C) of 80:15:5.

The charge and discharge capacity characteristics of the obtained electrode were measured in the same manner as in Example 1. The measurement results are given in Table 4.

TABLE 4

| | Ex. 10 | | Ex. 11 |
|---|---|---|---|
| Milled carbon fiber | | | |
| Carbonization temp. (°C.) | 750 | 950 | 750 |
| Content (wt %) | 10 | 30 | 15 |
| Milled graphite fiber | | | |
| Graphatized temp. (°C.) | 2900 | | 2900 |
| Content (wt %) | 60 | | 80 |
| Electrode characteristics | | | |
| 1st discharge capacity (mAh/g) | 322 | | 325 |
| 1st charge & discharge efficiency (%) | 85 | | 83 |
| 10th discharge capacity (mAh/g) | 310 | | 316 |
| 10th charge & discharge efficiency (%) | 99 | | 98 |
| Remark | 2 types of milled carbon fibers used | | 5 wt % acetylene black added |

What is claimed is:

1. A negative electrode material for use in lithium-ion secondary batteries, comprising:

milled pitch-based graphite fibers (A) obtained by graphitization at 2400° C. or higher and milled pitch-based carbon fibers (B) obtained by carbonization at 550° to 1300° C.

wherein both of said milled pitch-based graphite fibers (A) and said milled pitch-based carbon fibers (B) have an average particle size of 10 to 30 μm, and wherein the ratio of milled pitch-based carbon and graphite fibers having a particle size of 5 μm or less to all the milled pitch-based carbon and graphite fibers is not greater than 10% by weight.

2. The negative electrode material as claimed in claim 1, wherein the milled pitch-based graphite fibers (A) and the milled pitch-based carbon fibers (B) are blended at a weight ratio (A/B) of 95/5 to 40/60.

3. The negative electrode material as claimed in claim 1, wherein the milled pitch-based graphite fibers (A) are obtained by carbonizing infusibilized pitch fiber at 500° to 1500° C., milling the carbonized fiber to obtain milled fibers and graphitizing the milled fibers at a temperature of 2400° C. or higher.

4. A process for producing a negative electrode material for use in lithium-ion secondary batteries, which comprises the steps of:

infusibilizing pitch fiber to thereby obtain infusibilized pitch fiber;

carbonizing the infusibilized pitch fiber at 550° to 1300° C. and milling the carbonized fiber to thereby obtain milled pitch-based carbon fibers (B);

carbonizing the infusibilized pitch fiber at 500° to 1500° C., miling the carbonized fiber to obtain milled fibers and graphitizing the milled fibers at a temperature of 2400° C. or higher to thereby obtain milled pitch-based graphite fibers (A);

blending the milled pitch-based graphite fibers (A) with the milled pitch-based carbon fibers (B) to thereby obtain a blended carbon material; and molding the obtained blended carbon material into a negative electrode material, wherein said milling treatments and/or blending step are regulated so that the milled pitch-based carbon and graphite fibers have an average particle size of 10 to 30 μm, and that the ratio of milled pitch-based carbon and graphite fibers having a particle size of 5 μm or less to all the milled pitch-based carbon and graphite fibers is not greater than 10% by weight.

5. The process as claimed in claim 4, wherein the pitch fiber is produced by spinning mesophase pitch.

6. The process as claimed in claim 4 or 5, wherein the milled pitch-based graphite fibers (A) are produced by graphitizing part of the milled pitch-based carbon fibers (B) and blended with the balance of the milled pitch-based carbon fibers (B).

* * * * *